United States Patent [19]
Henson

[11] Patent Number: 6,167,383
[45] Date of Patent: Dec. 26, 2000

[54] METHOD AND APPARATUS FOR PROVIDING CUSTOMER CONFIGURED MACHINES AT AN INTERNET SITE

[75] Inventor: Ken Henson, Austin, Tex.

[73] Assignee: Dell USA, LP, Round Rock, Tex.

[21] Appl. No.: 09/158,564

[22] Filed: Sep. 22, 1998

[51] Int. Cl.[7] .................................................. G06F 17/60
[52] U.S. Cl. .................. 705/26; 705/27; 705/1; 709/26; 709/27; 364/401; 364/403; 364/221.2; 364/241.9; 364/261.2; 364/281.9; 395/500.1; 395/500.34
[58] Field of Search .................. 705/26, 27, 1; 709/26, 27; 364/401, 403, 221.2, 241.9, 261.2, 281.9; 395/500.01, 500.34

[56] References Cited

U.S. PATENT DOCUMENTS

| | | | |
|---|---|---|---|
| 4,389,706 | 6/1983 | Gomola et al. | 700/1 |
| 4,589,063 | 5/1986 | Shah et al. | 710/8 |
| 4,870,591 | 9/1989 | Cicciarelli et al. | 700/107 |
| 5,257,387 | 10/1993 | Richek et al. | 713/600 |
| 5,416,842 | 5/1995 | Aziz | 380/30 |
| 5,517,494 | 5/1996 | Green | 370/408 |
| 5,526,489 | 6/1996 | Nilakantan et al. | 709/228 |
| 5,535,276 | 7/1996 | Ganesan | 713/408 |
| 5,541,927 | 7/1996 | Kristol et al. | 370/408 |
| 5,570,291 | 10/1996 | Dudle et al. | 700/95 |
| 5,598,536 | 1/1997 | Slaughter, III et al. | 709/219 |
| 5,608,900 | 3/1997 | Dockter et al. | 707/102 |
| 5,613,012 | 3/1997 | Hoffman et al. | 382/115 |
| 5,640,193 | 6/1997 | Wellner et al. | 348/7 |
| 5,708,798 | 1/1998 | Lynch et al. | 395/500.01 |
| 5,764,886 | 12/1999 | Danielson et al. | 395/184.01 |
| 5,844,554 | 12/1998 | Geller et al. | 345/333 |
| 5,957,695 | 9/1999 | Redford et al. | 434/307 |
| 6,003,012 | 12/1999 | Nick | 705/10 |
| 6,009,406 | 12/1999 | Nick | 705/10 |

FOREIGN PATENT DOCUMENTS

| | | | |
|---|---|---|---|
| 2213576 | 8/1997 | Canada | H01L 12/28 |
| 0520770 | 12/1992 | European Pat. Off. | G06F 11/30 |

OTHER PUBLICATIONS

Doug Bartholomew, "Trawling for $1 billion", Industry Week, vol. 246, issue 8, pp. 68–71, Apr. 1997.

Anne Knowles, "Find out what your customers really want", Datamation, vol. 43, issue 2, pp. 68–72, Feb. 1997.

John Teresko, "Calico Technology: Concinity configuration/quotation system", Industry Week, vol. 245, issue 23, pp. 24–26, Apr. 1997.

'Microsoft Unveils Advertising, Commerce Model For Online Network', Electronic Marketplace Report, v9, n15, p1(1), Aug. 1995.

'Ironside Forges Opportunities In electronic Commerce', Manufacturing Automation, May 1998.

Girard, Peter, 'Harry and David', Catalog Age, p. 129, Sep. 1998.

(List continued on next page.)

Primary Examiner—Eric W. Stamber
Assistant Examiner—Akiba Robinson-Boyce
Attorney, Agent, or Firm—Haynes and Boone LLP

[57] ABSTRACT

A web-based online store includes a configurator, a cart, a checkout, and a database, further in which a user interface of the online store enables a custom configuration of a computer system according to an identification of a user belonging to a prescribed customer set. The configurator is provided for configuring a computer system with options selected according to a prescribed user input, the options and a respective pricing for each option being presented on a configurator web page in accordance with the identification of the user belonging to a prescribed customer set. The cart is provided for temporarily storing the customer configured computer system, the cart including a cart web page. The checkout is provided for presenting payment options and for obtaining payment and delivery information, the checkout including a checkout web page. Lastly, the database is provided for dynamically supplying configuration options to the configurator in accordance with the identification of the user belonging to the prescribed customer set. An online store method and user interface are also disclosed.

57 Claims, 11 Drawing Sheets

OTHER PUBLICATIONS

Christine Hudgins–Bonafield, 'Redwood Takes Banyan Beyone', Network Computing, n 60, p. 30, Aug. 1995.

'The UBL Reigns Truly Ultimate With Retail Store, Content Alliances, New Look', Apr. 1998.

Manson, Keith Antar, Calico: Calico Announces initial public offering, M2 Presswire, Coventry, Oct. 12, 1999 p. 1.

http://www.calicotech.com/products, 1999 Calico Commerce, Inc.

http://www.dell.com/us/en/gen/corporate/press/pressoffice$_{13}$us_1998–05–21–rr–000.htm, "Dell relaunches E–Commerce Site with New Features", May 21, 1998.

http://www.zdnet/com/sr/breaking/980223/980224g.html, "Microsoft To Walk A Fine Line With Online Shopping", Mary Jo Foley, Feb. 24, 1998.

Computer Record accession No. 02168314 & PC Week, v15, n10, p. 1 Mar. 9, 1998, "Oracle's ICS Sets Up Electronic Shop–Fast", Timothy Dyck.

Computer Record accession No. 02210346 & PC Week, v15, n33, p. 69, Aug. 17, 1998, "Netting Big Ticket Sales On the Web", Stephanie Neil.

http://corporate.pcorder.com/corpinfo/pressReleases/showRelease.asp?PR_ID–11, "Compucom and PcOrder.com partner to provide state–of–the–art electronic commerce solution", Jun. 3, 1997.

http://corporate.pcorder.com/corpinfo/pressReleases/showRelease.asp?PR_ID=5, "New company, PcOrder.com, creates first industry–wide electronic commerce system to transform PC sales process", Jun. 17, 1996.

http://corporate.pcorder.com/corpinfo/pressReleases/showRelease.asp?PR_ID=25, "PcOrder.com releases version 2.0 of PcOrder Online, the electronic commerce sales tool for resellers", Nov. 18, 1996.

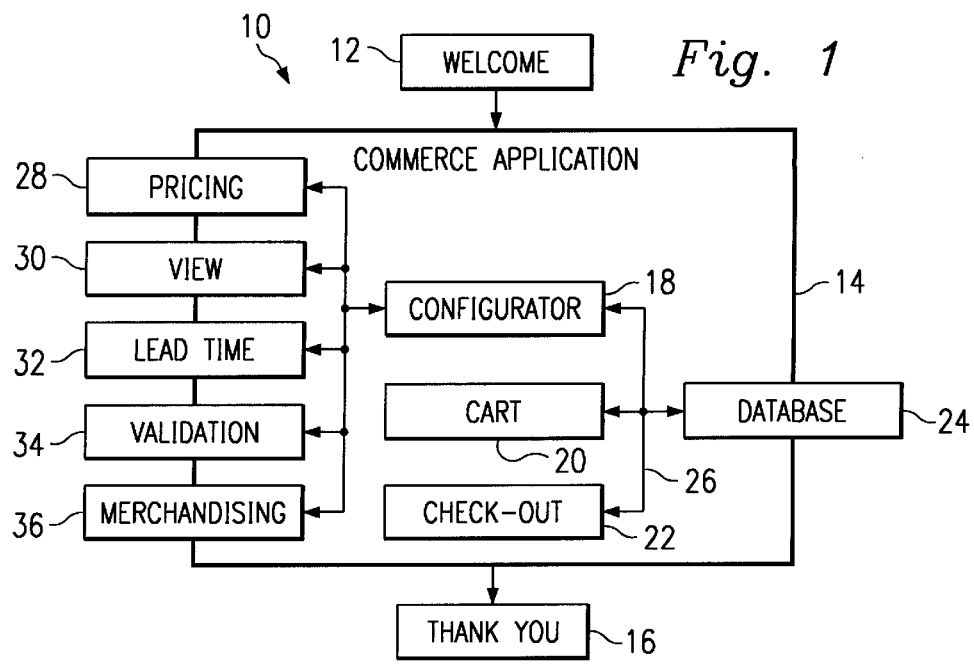
*Fig. 1*
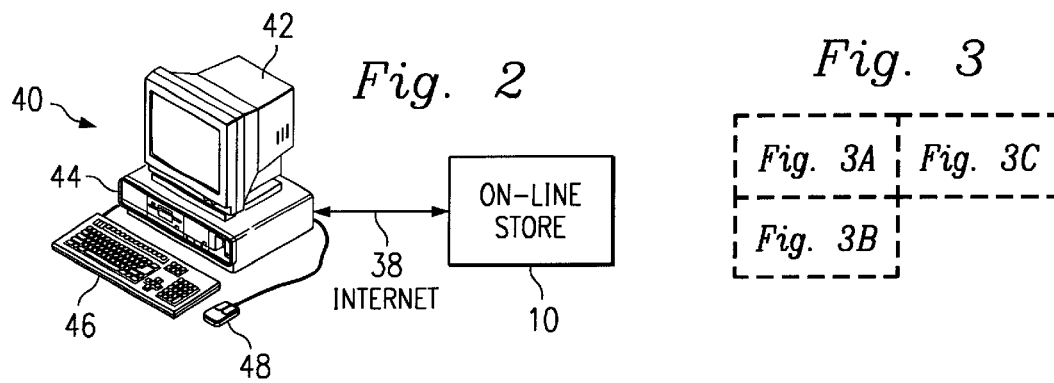
*Fig. 2*
*Fig. 3*
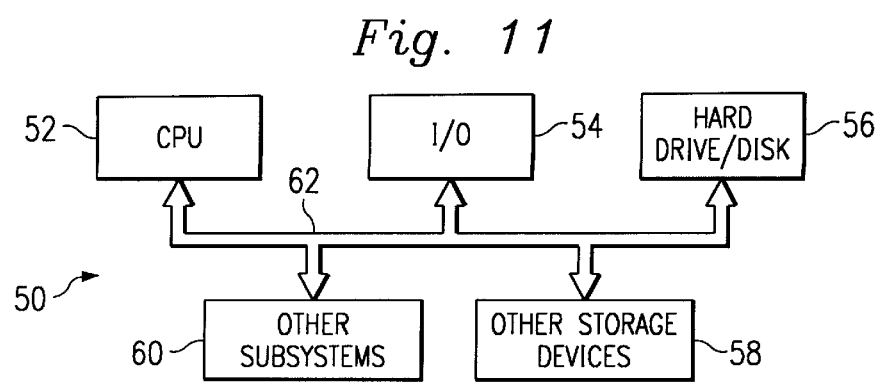
*Fig. 11*

Fig. 3A 70        79

DELL DIMENSION XPS R
Built with high performance and reliability in mind, the Dell Dimension XPS R series use the latest in technology to deliver the tremendous speed your high-end applications are craving.

Configured Price:*
$2,307
$87/month
36-Month Lease**
○ Business  ● Personal

✓ 2 selections may require changes to other configuration choices. Check below. ←84

Dell Dimension XPS R MiniTower
Pentium II processor, 400MHz with 512KB L2 Cache

Memory
The XPS R series features 100MHz SDRAM memory for faster RAM performance ←75
than the popular 66MHz memory.

| 96MB SDRAM ▼ | ←77

Hard Drive ⓘ HELP ME CHOOSE ←76
A larger hard drive provides more storage for your operating system, Internet files, applications, graphics and scanned images! Dell offers EIDE hard drives up to 16.8 GB. ←75

| 16.8GB 5400rpm Ultra ATA Hard Drive ▼ |

Monitor ⓘ HELP ME CHOOSE
Upgrading to a larger monitor is surprisingly affordable. Dell's line-up of exceptional monitors can deliver enhanced resolution and refresh rates, crisp, vibrant imaging and amazing color depth.

| 1000HS 17" (16.0" vis .26dps) Trinitron Monitor ▼ |
                                                            75

Video Card ⓘ HELP ME CHOOSE

| STB nVidia ZX 8MB 3D 2X AGP Graphics Card ▼ |

⊘ This option is not compatible with a Windows NT operating system.
   Please double-check your operating system selection. ←86

CD-ROM Drive ⓘ HELP ME CHOOSE

| 40X Max Variable CD-ROM Drive ▼ |

Sound Card ⓘ HELP ME CHOOSE
Crystal 3D 64V Wavetable Integrated Sound

Speakers ⓘ HELP ME CHOOSE

| harman/kardon HK-195 Speakers ▼ |

Storage Products ⓘ HELP ME CHOOSE
Back up valuable files or simply transport large amounts of data on one Zip 100MB cartridge which holds 70 times more than a standard floppy diskette.
Iomega Zip drives are not available with tape backups, Windows NT, or SCSI devices.
☐ Iomega Zip 100MB Internal Drive with Two Cartridges, WIN 95/98 [$99]
☐ Iomega Zip 100MB Internal Drive with One Cartridge, WIN 95/98 [$79]
☐ 3-Pak of Iomega 100MB Zip Cartridges [$49]

Operating System ⓘ HELP ME CHOOSE
Microsoft Windows 98

McAfee VirusScan 3.1 at no additional charge

| McAfee VirusScan 3.1 (For Windows 95 & 98) ▼ |

Bundled Software ⓘ HELP ME CHOOSE
Home Essentials 98/Entertainment Pack - The Puzzle Collection

Modem ⓘ HELP ME CHOOSE

If you have selected the Turtle Beach Montego A3D 64-Voice PCI Audio Card, please select a modem option with sound.

| 56K Capable, U.S. Robotics V.90 X2 Data/Fax Winmodem ▼ |

⊙ This modem is not available with Windows NT.  ←—86
Please double-check your operating system selections.

Network Card
Network connectivity can boost your productivity by sharing files over e-mail, sharing printers within workgroups and providing universal Internet access.

| None ▼ |

Keyboard

| Dell Comfort Key Keyboard ▼ |

Service ⓘ HELP ME CHOOSE

| 3Yr Limited Warranty; Yr 1 Next Bus. Day On-Site Svc ▼ |

Mouse
Microsoft PS2 Intellimouse

Floppy Drive
1.44MB Floppy Drive

Printers ⓘ HELP ME CHOOSE
Don't forget your printer! Whether you need to print your kid's artwork or output professional quality documents, Dell has the perfect printer to meet your needs. <u>Click here</u> for warranty information.
- ☐ HP DeskJet 722C Color Printer (Requires a printer cable) [$299]
- ☐ HP OfficeJet 600 (Includes a printer cable) [$499]
- ☐ HP LaserJet 6Lse 6ppm 600x600 dpi (Requires a printer cable) [$399]
- ☐ 10' IEEE Parallel Printer Cable [$24.99]

Scanners ⓘ HELP ME CHOOSE
Scanners let you turn hardcopies of photographs and graphics into digital files that you can send, print or manipulate with your computer. From personal to professional, we have a scanner for you. <u>Click here</u> for warranty information.
- ☐ HP ScanJet 5100Cse for Windows 98 [$299]

Power Protection ⓘ HELP ME CHOOSE
Electrical surges and power outages could damage your system - Protect your investment with a product from APC. <u>Click here</u> for warranty information.
- ☐ APC Surge Station Pro 8T2 [$39]
- ☐ APC Back UPS Office [$99]
- ☐ APC Back UPS Pro 650 PnP w/software [$289]

Software and Accessories
Save a trip to the store. Choose among these popular products that can make your new system even more versatile. <u>Click here</u> for warranty information.
- ☐ Microsoft Sidewinder Precision Pro with Flight Simulator [$99]
- ☐ Jump Start Kindergarten & Ready to read w/ Pooh [$69]

Configured Price: *
$2,307
$87/month
36-Month Lease**

72—[ UPDATE PRICE ]    [ ADD TO CART ]—74

Fig. 3C

**Buy Online or Call:
1-800-WWW-DELL**

Using this Page
Please select from the options listed to configure *your* system. Click "UPDATE PRICE" to make the price reflect any changes made to system options. When done, click "ADD TO CART" to keep shopping.

Choose Your View
Find the view that's right for you.
- Drop-down list view
- View all system options
- Print view (read only)

Please use the "Print view" if intending to alert us to your interest in this system via fax.

Know the Codes!
Recognizing them will help you build the system that's right for you.

- Help Me Choose –
  This icon signals the presence of additional information to help you with your selection. Click on the icon to view more details on available options.

- Compatibility Check –
  Options flagged with this icon require a check for compatibility with other system options. An icon does not mean your configuration is invalid, rather only that a check is needed.

- Lead Time Warning –
  Items flagged with this icon will cause a delay in the shipment of your order. Click on the icon where displayed for more details.

Fig. 5

| DELL.COM HOME | The Online Store<br>POINT, CLICK, CONFIGURE, BUY. IT DOESN'T GET ANY EASIER. | Buy Online or Call:<br>1-800-WWW-DELL |

DELL DIMENSION XPS R
Built with high performance and reliability in mind, the Dell Dimension XPS R series use the latest in technology to deliver the tremendous speed your high-end applications are craving.

Configured Price:*
$2,307
$87/month
36-Month Lease**
○ Business
◉ Personal

▷STORE MENU  ▷STORE HELP  ▷YOUR CART

⊘ 1 selection may require changes to other configuration choices. Check below.

Dell Dimension XPS R MiniTower
 ◉ Pentium II processor, 400MHz with 512KB L2 Cache

Memory
The XPS R series features 100MHz SDRAM memory for faster RAM performance than the popular 66MHz memory.
 ○ 64MB SDRAM [subtract $30]
 ◉ 96MB SDRAM
 ○ 128MB SDRAM [add $60]
 ○ 256MB SDRAM [add $349]
 ○ 384MB SDRAM [add $648]
 ○ 64MB SDRAM with ECC [subtract $40]
 ○ 128MB SDRAM with ECC [add $109]
 ○ 256MB SDRAM with ECC [add $398]
 ○ 384MB SDRAM with ECC [add $648]

Hard Drive ⓘ HELP ME CHOOSE
A larger hard drive provides more storage for your operating system, Internet files, applications, graphics and scanned images! Dell offers EIDE hard drives up to 16.8 GB.
 ○ 10GB 7200rpm Ultra ATA Hard Drive [subtract $119]
 ○ 10GB 5400rpm Ultra ATA Hard Drive [subtract $188]
 ○ 13.6GB 5400rpm Ultra ATA Hard Drive [subtract $149]
 ○ 14.4GB 7200rpm Ultra ATA Hard Drive
 ◉ 16.8GB 5400rpm Ultra ATA Hard Drive

Monitor ⓘ HELP ME CHOOSE
Upgrading to a larger monitor is surprisingly affordable. Dell's line-up of exceptional monitors can deliver enhanced resolution and refresh rates, crisp, vibrant imaging and amazing color depth.
 ○ 1600HS 21" (19.8" vis, .26dp, 1600 x 1200 max res.) Trinitron Monitor [add $578]
 ○ 1200HS 19" (17.9" vis .26dp) Monitor [add $79]
 ◉ 1000HS 17" (16.0" vis .26dps) Trinitron Monitor
 ○ 1000LS 17" (15.9" vis) Monitor [subtract $119]
 ○ Video Ready w/o Monitor [subtract $349]

Video Card ⓘ HELP ME CHOOSE
 ○ ATI XPERT 98D 8MB 3D 2X AGP Graphics Card [subtract $29]

Using this Page
Please select from the options listed to configure *your* system. Click "UPDATE PRICE" to make the price reflect any changes made to system options. When done, click "ADD TO CART" to keep shopping.

Choose Your View
Find the view that's right for you.
 ○ Drop-down list view
 ◉ View all system options
 ○ Print view (read only)
Please use the "Print view" if intending to alert us to your interest in this system via fax.

Know the Codes!
Recognizing them will help you build the system that's right for you.

ⓘ Help Me Choose −
    This icon signals the presence of additional information to help you with your selection. Click on the icon to view more details on available options.

⊘ Compatibility Check −
    Options flagged with this icon require a check for compatibility with other system options. An icon does not mean your configuration is *invalid, rather only* that a check is needed.

ⓘ Lead Time Warning −
    Items flagged with this icon will cause a delay in the shipment of your order. Click on the icon where displayed for more details.

Fig. 7

DELL
DELL.COM HOME

The Online Store
POINT, CLICK, CONFIGURE, BUY. IT DOESN'T GET ANY EASIER.

Order Checkout – Contact Information (step 1 of 5)

How can we contact you?

- Name (First, MI, Last): [ ] [ ] [ ]   Title: [Mr. ▼]
- E-Mail Address: [ ]
- Daytime Phone: ( [ ] ) [ ]   Ext: [ ]
- Best Time to Call: [Anytime ▼]

Who will own the items ordered?

- ⊙ I will – the bill should reflect that I am responsible for submitting payment.
- ⊙ My organization will – please bill the business or organization listed below:

Company/Organization: [ ]
   (Required if an organizational purchase)

Is the owner a previous Dell customer?

- ⊙ Yes – Dell Customer # (if known): [ ]
- ⊙ No

Were you assisted by a Sales rep, or do you have an assigned rep?

- ⊙ Yes – I was assisted by a Sales representative: [ ]
- ⊙ Yes – I have an assigned Sales representative: [ ]
- ⊙ No

| D≪LL DELL.COM HOME | The Online Store<br>POINT, CLICK, CONFIGURE, BUY. IT DOESN'T GET ANY EASIER. |
|---|---|

Order Checkout – Contact Information (con't) (step 1 of 5)

Type of business or organization: ←

- ◎ Large Business (>2000 total employees)
- ◎ Mid-Size Business (400–2000 total employees)
- ◉ Small Business (<400 total employees)
- ◎ Federal Government Agency or Organization
- ◎ State or Local Government Agency or Organization
- ◎ Higher Educational Institution or School System
- ◎ K-12 Educational Institution or School System
- ◎ Healthcare Organization or Facility

| DELL | The Online Store |
|---|---|
| DELL.COM HOME | POINT, CLICK, CONFIGURE, BUY. IT DOESN'T GET ANY EASIER. |

Order Checkout – Shipping Information (step 2 of 5)

Where do you want your order shipped?

118 {
- Company/Organization: [Dell Computer Co.]
- Attention/Care of (First, MI, Last): [k] [ ] [henson]
- Street Address: [ ]
- Suite/Apt #: [ ]
- City/State: [ ] [(Select from list) ▼]
- Zip Code: [ ] Zip+4: [ ]
- Phone Number: ([657]) [657-6577] Ext: [ ]
- Fax Number: ([ ]) [ ]

☐ My shipping and billing address information are the same.

How do you want your order shipped?

120 {
- ○ Next Business Day Delivery (approximately $145 per desktop or server, $62 per laptop)
- ◉ 2nd Business Day Delivery (approximately $110 per desktop or server, $45 per laptop)
- ○ Lowest-Cost Delivery (shipping time will be longer)
- ○ Use my Designated Carrier (info below is required):
  - Carrier Name: [ ]
  - Account # with Carrier: [ ]
  - Method of Delivery: [ ]

Any special instructions? (We will do our best, but cannot make any guarantees.) [ ]

"No Export" Intent ←

☐ By checking this box, I acknowledge that the computing equipment I am ordering is not for export, and agree to neither export any portion of this order from the U.S. nor permit another to do so. (We cannot accept orders where the intent is to export materials from the U.S.)

| DELL.COM HOME | The Online Store<br>POINT, CLICK, CONFIGURE, BUY. IT DOESN'T GET ANY EASIER. |

Order Checkout — Billing Information (step 3 of 5)

Your order will be billed to:

122 {
- Company/Organization: [Dell Computer Co.]
- Attention/Care of (First, MI, Last): [k] [ ] [henson]
- Street Address: [ ]
- Suite/Apt #: [ ]
- City/State: [ ] [(Select from list) ▼]
- Zip Code: [ ] Zip+4: [ ]
- Phone Number: ([657]) [657-6577] Ext: [ ]
- Fax Number: ([ ]) [ ]
- Tax Status: [Treat order as taxable ▼]
  (Tax-exempt status requires a tax certificate to be on file with Dell; if not on file, the order will be treated as taxable.)
- Internal Billing Reference: [ ]
  (Enter any internal ID, such as a cost center, you want to show on your online purchase order)

Purchasing Agent Information
- Name (First, MI, Last): [k] [ ] [henson]
- Phone Number: ([657]) [657-6577] Ext: [ ]
- E-Mail Address: [ken_henson@dell.com]

How do you want to pay for your order?

124 {
- ◉ Credit Card — Accept my credit card information now
- ○ Credit Card — Please call me for my credit card details
- ○ Business Lease
- ○ Credit Terms — Net 30 days (for qualified businesses/organizations only)

[CONTINUE]

METHOD AND APPARATUS FOR PROVIDING CUSTOMER CONFIGURED MACHINES AT AN INTERNET SITE

CROSS-REFERENCE TO CO-PENDING APPLICATION

This application relates to co-pending U.S. patent application Ser. No. 09/009,401, filed on Jan. 19, 1998, entitled "Method and Apparatus For Providing And Accessing Data At An Internet Site", naming Amy Van Wyngarden as inventor. The co-pending application is incorporated herein by reference in its entirety, and is assigned to the assignee of the present invention.

BACKGROUND

1. Field of the Invention

The disclosures herein relate generally to build to order computer systems, and more particularly, to an online store user interface for enabling custom configuration, pricing, and ordering of a computer system via the Internet.

2. Discussion of the Related Art

With a first generation web based on-line store, a customer was given an ability to select a base computer system (or chassis), customize the system, and price it. Such an on-line store focused initially upon the bare necessities. That is, build a system and get a price.

In the prior online store, a configurator allowed a customer to customize a system and procure it online. The configurator allowed a customer to select a given computer system model and to customize the computer system according to the user selected options. Such a configurator was most well received by persons in the know about a particular computer system, that is, those who were very self-sufficient without the assistance of a sales representative. However, the earlier generation online store was not user friendly in that it merely wet the appetite of the less sales-sufficient computer customers. In the later instance, the previous online store allowed such customers to answer one of their questions, but not all of them. Those customers still needed the assistance of a sales representative. In addition, with the prior online store, there was an assumption that in presenting all available options, the options all work together and the customer wouldn't be creating a system that could not be built by manufacturing. That assumption was not always correct.

Further with respect to the previous generation on-line store, a disadvantage was that a customer could place an order and find out only later, after the order was taken off of the on-line system and entered into another order management system, that the customer-configured system shipment would be delayed (i.e., more than the typical build time and delivery). It was the order management system which would inform a sales representative to communicate with the customer. Typically, the sales representative would inform the customer of a final order amount and confirmation of the order. In addition, it was only then that the customer would find out that, "oh by the way, the delivery time for that system is five weeks." At that, the customer would be highly inclined to cancel the order, because the customer thought that the system would be shipped within a typical delivery time (on the order of about a week).

The prior methods used for an online store included a web objects-based application providing the capability to custom-configure and order a particular computer system. The initial online store application offered customers the ability to select and price key system options, the ability to include multiple systems on a single order, and the ability to provide information necessary for the placement of a standard computer system order.

The capability to self-select system options and then price them was afforded through the presence of an online configurator. This configurator enabled customer selection of key, system-defining components from a display of available system options for a chosen system. The display of available options included the presentation of a "delta" price, wherein a change in system price was affected by selection of an option. The configurator afforded the ability to update overall system priced based upon selections made. The capability to include multiple items in a single order was afforded by the presence of a "shopping cart", wherein the shopping cart represents an equivalent to the traditional shopping cart. The shopping cart enabled customers to group disparate systems together as an order, as well as specify a quantity for each individual system to be included on the order. Furthermore, the capability to provide customer-specific information required for the placement of a standard order was afforded through the presence of an online "checkout", the checkout including essentially a form for facilitating the capture of requested and required information. The checkout form included simple logic rules to assure entry of the required fields.

The prior generation web-based online store application was problematic in that a responsiveness to customer requests was becoming unacceptable, for example, on the order of upwards of fifty percent (50%) of requests were unmet during peak business hours. Maintenance of a programming code for the online store was more time intensive and less scalable than desired. The feature set of the online store offered little to no point-of-sale merchandising capability. The feature set of the online store still further offered no means for delivering more detailed option information. Yet still further, the feature set of the online store offered no means for warning customers as to known compatibility issues between select system options. The feature set also offered no means for communicating the effect that the selection of certain system options would have on the system's delivery time. A customization of the online store for use by various business segments within the online store vendor or computer system manufacturer was less than optimal. The net effect of the problems with the prior online store included lost business and decreased customer satisfaction with the online buying experience.

Other problems existed in the previous generation online store including a lack of responsiveness to customer requests. In addition, the previous generation online store suffered from an incompleteness of information delivery with respect to a servicing of customer demand for computer system related information. Still further, system incompatibility issues were not addressed. An improved accuracy, reliability, and overall quality of the online store and buying experience for overcoming the problems as discussed above is thus desired.

SUMMARY

According to one embodiment, a web-based online store having a user interface for enabling a custom configuration of a computer system according to an identification of a user belonging to a prescribed customer set includes a configurator, a cart, a checkout, and a database. The configurator is provided for configuring a computer system with options selected according to a prescribed user input. The options and a respective pricing for each option are presented on a configurator web page in accordance with the identification of the user belonging to a prescribed customer set. The cart is provided for temporarily storing the customer configured computer system, wherein the cart includes a cart web page. The checkout is provided for presenting payment options and for obtaining payment and delivery information. The checkout further includes a checkout web page. Lastly, the database is provided for dynamically supplying configuration options to the configurator in accordance with the identification of the user belonging to the prescribed customer set.

In another embodiment, the configurator further includes merchandising recommendations for available options and their respective option details, the merchandizing recommendations being presented on the configurator web page. The cart further includes merchandising recommendations for add-on options, the merchandizing recommendations being presented on the cart web page. The payment options of the checkout are presented on the checkout web page. The database is further for dynamically supplying the merchandizing recommendations to the configurator in accordance with the identification of the user belonging to the prescribed customer set. The database is also further for dynamically supplying the merchandizing recommendations to the cart in accordance with the identification of the user belonging to the prescribed customer set. The database is still also further for dynamically supplying the payment options to the checkout in accordance with the identification of the user belonging to the prescribed customer set.

In yet another embodiment, the configurator further includes a warning indicator for indicating an option which is subject to adversely impacting a shipment of the configured computer system. The online store includes yet other additional options and features as discussed herein. An online store user interface is disclosed also.

The online store of the present disclosure includes a single online store which advantageously generates a given online store view for a particular customer set, customizable per customer. While the online store has the appearance of many different stores to many different customers, in essence, it's the same core online store but customizable for each customer and database driven. Customization of the online store has thus been advantageously improved, in conjunction with the added features as discussed herein.

The embodiments of the online store of the present disclosure advantageously improve upon accuracy, reliability, and overall quality of an online buying experience through an enhanced online commerce application specific to the ordering of custom-configured computer systems, including personal computer systems. The embodiments of the online store are optimized for responsiveness (availability and speed) to customer requests and for completeness in servicing of customer demand for personal computer related information.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which:

FIG. 1 illustrates an overview block diagram representation of the on-line store according to the present disclosure;

FIG. 2 illustrates access to the on-line store via the Internet using a computer system according to one embodiment of the present disclosure;

FIG. 3, including 3A, 3B, and 3C, illustrate an exemplary page of the on-line store including various features of the customer configured machine method and system apparatus of the present disclosure;

FIG. 5 illustrates a portion of an exemplary page including an alternate presentation view of a configuration screen of the on-line store, the alternate presentation view including all system options;

FIG. 7 shows a portion of a checkout page of the on-line store according to one embodiment of the customer configured machine method and system apparatus of the present disclosure;

FIG. 8 shows a portion of a checkout page of the on-line store according to another embodiment of the customer configured machine method and system apparatus of the present disclosure;

FIG. 9 shows another portion of the checkout page of FIG. 8;

FIG. 10 shows yet another portion of the checkout page of FIG. 8; and

FIG. 11 is a block diagram of an exemplary personal computer system.

DETAILED DESCRIPTION OF THE PREFERRED EMBODIMENT

Figure 4:
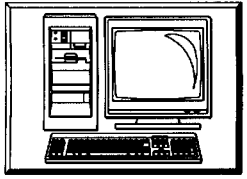
FIG. 4 is illustrative of a portion of an exemplary page of the on-line store including a long lead time warning of the customer configured machine method and system apparatus of the present disclosure.

In conjunction with the present embodiments, an on-line store is one component of an Internet website for which a customer may go to configure a particular computer system, for example, according to desired options of the customer. The on-line store is typically a subset of a larger Internet website. At the on-line store, a customer can select one or more products that the customer is interested in. Upon selection of a particular product, the on-line store presents the customer with the ability to go to the product information for the particular product, customize the product, price the customized product, purchase the product, and other actions as discussed herein. While shopping happens in the website (i.e., selection of a particular kind of system (chassis) by a customer), when the customer is ready to purchase a customized system, the customer is then directed (invisibly) to that part of the website which the on-line store application controls.

Referring now to FIG. 1, the present implementation of an online store 10 for use in generating customer configured machines, i.e., customer configured computer systems, will be discussed herein below. The online store 10 includes a welcome or introductory module 12, a commerce application module 14, and a thank you module 16 (i.e., appreciation for your order). The present embodiments further include an enhanced online store user interface which advantageously enables the system configuration, pricing, and ordering of a computer system via the Internet. The commerce application 14 includes a configurator 18, shopping cart 20, checkout 22, and database 24. The database 24 provides information to the configurator 18, shopping cart 20, and checkout 22, as illustrated by arrows 26. The configurator 18 includes a pricing module 28, a view module 30, a lead time warning module 32, a validation (or compatibility) warning module 34, and a merchandising module 36. The various modules of the configurator 18 are being driven by data from the database 24, as further discussed herein below.

The online store 10 includes welcome page 12, configurator page 18, cart 20, checkout 22, and thank you page 16. The welcome page 12 includes a static page and generally resides outside of the commerce application 14. The configurator, cart, and checkout are within the commerce application and are prone to be driven off the database, thus the configurator, shopping cart, and checkout are each linked to the database as illustrated in FIG. 1. The cart includes a cart merchandising message feature which is driven off of the database. Still further, the checkout includes a payment feature, delivery feature, personal verses business feature, and instructional ext features (i.e., how to fill out an online form).

The welcome page 12 is typically an introductory page and includes a link into the online store 10. The welcome page is typically a static welcome page. The online store 10 includes a smart process for the configurator 18, cart 20, and checkout 22 which are all driven by the database 24. Upon completion of a checkout, a customer would be linked to a static thank you page 16. The thank you page 16 provides a message of gratitude to the customer for having placed the order or for visiting the online store.

As discussed herein, the online store of the present disclosure includes a smart process. The degree of smartness of the present online store is greater than that of a prior online store, wherein a level of smartness in the prior online store was focused on the configurator. The configurator of the prior online store would present to the user the system selected off from the welcome page and include all available options. The smartness of the prior online store was in describing the choices for the system which the customer had selected. The present online store takes into account that some choices are not as right as others. Thus the configurator of the present online store has been made smarter. A level of smartness has also been added to the shopping cart and the checkout, where such a level of smartness did not exist previously. Thus the smartness of the configurator has been improved and smartness has been added to the cart and checkout. Programming code for executing the improved smartness and the added smartness can be included in a separate programming module or software package or can be integral with the online store commerce application. The database and the online commerce application that drives the database make up the online store. The database can be included within the commerce application of the online store, also. Programming code and the functions as described herein may be implemented using programming techniques well known in the art.

Referring once again to FIG. 1, aspects of the configurator 18 which are being driven by the database 24 are illustrated. In essence, the entire configurator 18 is being driven by the database. As mentioned, the configurator 18, shopping cart 20, and checkout 22 are each part of the commerce application 14 and prone to be driven by the database 24. For example, with the shopping cart 20, there can be provided additional merchandising information coupled with a particular system which has been configured and placed in the shopping cart by an online store customer, as will be discussed further herein below.

Turning now to FIG. 2, a customer can access the online store 10 using any suitable computer equipment 40, via the Internet 42. The computer equipment 40 may include a display 42, computer 44, keyboard 46, and pointing device 48. Display 42 is used for displaying the various pages of the online store while a customer is using the online store.

Referring briefly to FIG. 11, a system block diagram of a computer system 50 is shown having features thereof configured in accordance with the online store 10 as discussed herein. The computer system 50 includes a central processing unit (CPU) 52, input/output (I/O) devices, such as a display, a keyboard, a mouse, and associated controllers, collectively designated by a reference numeral 54, a hard disk and drive 56, and other storage devices, such as a floppy disk and drive and other memory devices, collectively designated by a reference numeral 58, and various other subsystems, collectively designated by a reference numeral 60, all interconnected via one or more buses, shown collectively in FIG. 11 as a bus 62.

Turning now to FIG. 3 (3A, 3B, and 3C), from a system configuration options screen 70, a customer of the online store 10 can build a customer configured machine by selecting from options listed on the configuration screen 70. The pricing option module 28 includes an update price function. The update price function causes the price displayed on the configuration screen to reflect any changes made to the system options. Selection of the update price function can be accomplished by clicking on an "UPDATE PRICE" icon 72 on the configuration screen. Upon obtaining a desired configuration, a customer could then select the "ADD TO CART" icon 74 to add the configured system to the shopping cart 20 and continue shopping, as desired.

The present online store application and system provide an on-line store application which includes configuration, pricing, validation, shipment delay indication, and merchandising modules. The validation module provides validation of some form with respect to the customer built configuration. The shipment delay indicator provides the customer with any lead time warnings or shipment delays which would occur as a result of the selection of specific options. In addition, the merchandising module provides messaging, alternatively referred to herein as merchandising information or messaging, of options recommended to be selected in a particular configuration, including, for example, which options may be better than others.

With respect to the lead time or shipment delay module 32, a long lead time warning is provided with the use of a warning icon. In one embodiment, the long lead time warning icon 80 is in the form of a yellow exclamation mark, for example, as shown in FIG. 4. The warning icon is presented to the online shopper upon the selection of a system option that has been identified as having a significant impact on the time to delivery of the system of interest. The warning icon and associated messaging are made present in the configurator once an update/refresh of the web page has been requested, for example, through clicking on any of a number of store navigation or action buttons. The presentation of the warning is in two parts. A first part includes a general alert 80 to the presence of any number of potentially problematic options, the general alert being displayed on the web page, for example near the top of the page. Secondly, a long lead time icon 82 is displayed adjacent to each long lead time option's position in the configurator. Options are manually identified as worthy of a long lead time warning via entry of a flag in an item master record of the store product database 24. Online shoppers can click on the warning icon and receive a manually-maintained listing of all items currently marked as significantly extending system delivery with an estimated time to delivery.

Further with respect to the lead time delay or shipment delay indication module, a lead time delay indicator provides the customer with an indication that a particular chosen option and/or combination of options will result in a shipment delay, and may further include an indication of a certain amount of time for a delay. In other words, the shipment delay indicator provides the customer with advance notice that a particular selected option or options will result in a shipment delay. For example, a shipment delivery may be adversely affected in that the lead time or shipment is delayed from a one week build and delivery to five weeks.

The shipment or lead time delay indicator of the present embodiment advantageously provides an advance or early indication to the customer of a potential shipment delay which could occur as a result of having selected a particular option. The customer thus does not have to wait until after having submitted the order, but rather can find out about any shipment delays as the customer is configuring and/or building his particular computer system online. The shipment or lead time delay indicator is preferably a dynamic indicator.

In connection with another enhancement to the on-line store application, merchandising recommendations are provided to the customer during the customer's custom building of a particular system. A merchandising recommendations module 36 enables point-of-sale merchandising, to include the providing of merchandising messaging. Merchandising messaging 76 may comprise, for example, generic text about a particular product, feature, and/or option (FIG. 3). The merchandising recommendations module is an information type delivery module for delivering messages to one or more positions within a page of the on-line store application. The merchandising recommendations module may also enable specific messaging to be called in response to the particular choices being made by the customer during the configuring of a custom computer system. The on-line store application thus can include merchandising messaging, as well as warning messages (i.e. from the validation module).

Merchandising module 36 includes merchandising messaging 79, option recommendations 75, and option details 76. Still referring to FIG. 3, option recommendations 75 provide for the display of a text message for the express purpose of recommending an option selection 77 at each option selection point within the configurator. Additional usage to further educate or assist customer selection of valid system options was also recognized. Option recommendation/text messaging are obtained from entries in the store produce database 24. Option details 76 provide an ability to link from the configurator to more specific detailed information about the system selection options presented. Links are made possible at each point where a system option selection was possible to aid in the choosing of the correct option from displayed alternatives. The presence of a link is triggered by the entry of a web page location (i.e., URL) for the page containing the detailed information in the store product database 24.

The on-line store further includes validation of a configuration built by a customer. Validation (or compatibility) provides the customer with a validation message indicating an occurrence of when the options selected for a particular system are not correct. If the options selected for a particular system will adversely affect the shipment of the configured system, then a warning message is issued to enable the user to modify options accordingly. In other words, the validation enhancement lets the customer know when one or more options are not compatible for one reason or another. The validation enhancement includes built-in logic which checks the particular configuration built by the customer and indicates whether or not the selected options can be built together for the particular configuration. If two or more options are incompatible, then in one embodiment, the validation enhancement returns a message indicating that the options are incompatible, as further discussed herein.

With respect to validation 34, a system option compatibility warning is issued, similar to the long lead time warning. The system option compatibility warning includes an icon, for example, in the form of a green check mark as shown in FIGS. 3 and 4. The system option compatibility warning icon is presented to the online shopper when a system option identified as having an incompatibility with another system option is recognized as a customer selection. Again, the warning icon and associated messaging are made present in the configurator once an update/refresh of the web page has been requested, for example, through the clicking on any of a number of store navigation or action buttons. The presentation of the warning is in two parts. First, a general alert 84 to the presence of any number of potentially problematic system options is displayed on the web page, for example, near the top of the page. Secondly, an option compatibility icon 86 is displayed adjacent to each potentially incompatible option's position in the configurator. Unlike the long lead time warning, the option compatibility warning is accompanied by a text message explaining the possible incompatibility. According to one embodiment, the presence of a warning only indicates the potential for incompatibility to exist and does not mean that one has been programmatically identified. Options are manually identified as having a potential incompatibility with other system options via entry of the warning text in the store product database 24.

Validation preferably includes a cross-checking of a combination of options. The cross-checking determines whether or not the particular combination of options can be physically built. For instance, a product group may indicate that certain things cannot fit or that the selected motherboard will only allow three things to be added, however, the customer has selected four things. Another example might include, a particular option requiring the selection of a second option, so the additional option must be selected, otherwise the system cannot be built or an indefinite shipment delay will result.

Validation of a customer built system assists in increasing a customer order compliance on the part of the on-line store. Those orders which do not comply (i.e., orders for systems which for one reason or another cannot physically be built) are advantageously managed down to a significantly lowered percentage of occurrences than previously achievable. Customers of the on-line store application thus receive advance warning when an option will not work for a given configuration. The customer can then modify, change, and/or delete the particular option which gave rise to the validation warning.

With respect to the present embodiments, two types of validation are contemplated. A first type of validation is referred to as passive validation. Passive validation relates to the validation module knowing that specific options don't work together, and providing a validation message that specific options should not be included in the same configuration. A second type of validation is referred to as active validation. Active validation is the active cross-checking of the options of a configuration and indicating the occurrence of a problem when the problem is detected. That is, upon the detection of the specific options within the same configuration, a warning can be provided to the customer.

Alternatively, upon the selection of a first option, wherein the first option cannot exist with a second option within the same configuration, selection of the second option can be disabled. In the latter instance, one embodiment may include only those options which are compatible to the first option to be enabled when displayed. Additionally, messages can be displayed indicating the particular incompatibility with the second option, for example.

With reference again to the configurator, the view module 30 includes an "all option" configurator view. That is, an ability to change from a standard view 70 (as shown in FIG. 3) to an "all option" view 90 (as shown in FIG. 5) is provided. The standard view of the online configurator is where system options 77 are presented via "drop-down" selection boxes and only the currently selected option is displayed. The standard view is preferably the default display, i.e., displayed without a shopper action. However, selection of the standard view may be accomplished via selection of the standard view selection button 96 (FIG. 3) The "all option" configurator view is where all system selection options are shown at the same time. In the later view, selections are made via use of "radio buttons" 92. Activation of the "all option" configurator view is made by selection of the appropriate view selection button 94 (FIG. 5).

In accordance with another aspect of the online store, the shopping cart is customized with merchandising options. The cart takes on merchandising options similar to what the configurator is doing. With the customizable checkout, the online store thus provides an end-to-and customizable store, at least to some degree. The shopping cart is the least customizable portion of the online store. The configurator is the most customizable portion of the online store. The checkout includes a customizable portion of the online store having a level of customization in between that of the shopping cart and the configurator. The online store is thus end-to-end customizable. The welcome page may also be made customizable to a given extent, being driven by the database, also.

Figure 6:
FIG. 6 illustrates a page of a shopping cart of the on-line store according to an embodiment of the customer configured machine method and system apparatus of the present disclosure.

In connection with the shopping cart 20, custom merchandising messaging 100 is provided. Space for the display of customer-specific merchandising messaging 100 as to up-sell and cross-sell opportunities are made available in the shopping cart. The entry of a text message in the store database 24 triggers the presentation of the merchandising or informational content on the shopping cart web page 102 as shown in FIG. 6. The cart message is preferably varied on a customer-by-customer basis, i.e., customizable by store. The shopping cart web page 102 further includes an ability for a user to edit or delete contents of the shopping cart, indicated collectively by reference numeral 104. Other options, indicated collectively by reference numeral 106 include continue shopping, save the cart, and place the order. Additional messaging, collectively referred to by reference numeral 108, is provided also.

Further with respect to the shopping cart, merchandising recommendations can be provided based upon the contents of the shopping cart. That is, based upon the contents of the user's shopping cart, is there something that could be recommended as an upgrade or a cross-sell. Specific to the customer, what is it that could be helpful about what to do next with respect to the customer configured machine in the shopping cart. The online store shopping cart includes providing merchandising messaging, for example, as shown in FIG. 6. Placing of the merchandising messaging is preferably dependent upon the contents of the shopping carts, specific to a particular user. The above has described what can be referred to as active messaging. Likewise, the messaging can also be passive messaging. Passive messaging does not look at what is in the cart, but rather, displays a message not necessarily directly connected with what is in the cart. For example, the passive messaging may include a particular message to be displayed during a particular time period. The messaging is thus static or passive. The shopping cart merchandising messaging presents to the user an additional effort prior to checkout by the online store vendor to advertise merchandise or service, or further recommended items for the user to purchase. For example, add-ons to the computer system, extended warranty service, software, hardware, printers or other devices, may be advertized. The shopping cart is thus database driven. Merchandizing recommendations are provided from the database into the shopping cart. As discussed, once a desired system is configured by a customer, the configured system can then be added to the shopping cart.

Cart content screening is another feature of the online store according to the present disclosure. That is, the shopping cart further includes cart content screening. Cart content screening includes an ability to identify when illogical/invalid combinations of systems (i.e., ones being offered by two different business segments) are attempted to be placed in the same shopping cart. The cart content screening restrict such a situation from occurring. Appropriate logic is included into the commerce application to screen for combinations of systems attempting to be placed it the shopping cart that would be incompatible for business reasons.

With respect to cart content screening, the online store vendor cannot checkout a customer as a somebody until the online store knows who to treat the customer as. The items in the cart determine who the customer is. For example, a customer may purchase from the federal government store, referred to as a G.S.A. contract. A customer may also be able to purchase from retail, corresponding to the online store unlimited. That is an allowable combination since a federal customer can purchase off contract and on contract. What is an illogical combination is for a G.S.A. customer to have a first discounted pricing and also for that customer to go to a corporate business store where a different discounted pricing is applied. The presence of items in the cart with pricing from two different discounted pricing lists, do not inform the online store who the customer is. A customer cannot be both a discounted customer A and a discounted customer B, but rather one or the other. Thus, the cart content screen prevents a customer from proceeding to checkout until the customer removes one of the conflicting discounted items.

As discussed, the shopping cart is based upon an identification of a user as belonging to a particular customer set. A user is not limited as to how the user can get into the online store. A user can place an item into the cart, back out of the store, re-enter and place another item in the cart, because the cart is controlled by a session. It is possible then that a user could have selected two or three items from different stores. Items can thus be grouped, for example, as being from a specialty store and a non-specialty store. A customer, however, may not have items taken from two specialty stores within the cart at one time for the following reason. Processing items from two different specialty stores in one cart is illogical to the online store. The online store is not set up to recognize a customer as anything but one of those special customers in such an instance. The checkout cannot determine who the customer is when items from more that one specialty store are in the cart. If only items from the federal specialty store are left in the cart to check-out, then the process can proceed to checkout. The user is notified that a conflict exists. The government page is public knowledge. Cart content screening is useful in preparation for checkout. Customized checkout can only be presented to an identified customer, wherein the screening is accomplished to identify the customer. Non-logical orders (i.e., containing items from two specialty stores) are prevented from reaching checkout, because the non-logical orders are incompatible for business reasons (e.g., different pricing).

Referring now to FIGS. 7–10, checkout will now be discussed in greater detail. According to the online store of the present disclosure, a custom checkout page content is provided. Checkout 22 includes an ability to dynamically generate customer-specific variations of a standard online store checkout form. The delivery and payment options of the checkout display web page 110 are controlled via the store database 24. Additionally, the routing of online submitted customer orders is controlled via display of recognized customer classifications (e.g., small business, federal government) dictated by store database 24 entries. Lastly, custom explanations of checkout requirements and checkout instructions are enabled through the support of three separate, database-driven text messaging sections. This combination allows for the creation of a checkout form that best fits the data gathering and information delivery requirements for specific customers. The checkout web page includes identification input 112, who will own the items ordered 114, type of business or organization 116, where the order is to be shipped 118, how the order is to be shipped 120, and lastly billing and payment information, 122 and 124, respectively.

In addition, checkout according to the present embodiments is now customizable by store, whereas, in contrast, checkout in a prior online store included a static form. In other words, the checkout page or display of the present embodiments is reflective of a customer selected payment option selected by the customer. For instance, if a customer desires to purchase a customer-configured computer system using a credit card, then the checkout displays a form required for the inputting of the customer's credit card information only. No other details are displayed, such as, personal lease payment information or other types of payment options. As a result, the customer is not subject to being confused by unnecessary information. The credit card option page is specific to obtaining the customer's credit card information. In the past, a customer would be presented with an all-in-one form, the customer having to complete the all-in-one form having multiple inputs, information, and text messaging for multiple payment options which further tended to confuse a customer. With the all-in-one form, a customer could easily become confused by text messaging or compliance with instructions for filling out the form, etc.

Knowing the store which the customer is in, the on-line store presents a checkout appropriate to the store. For instance, if a customer is in the business online store, the checkout would not display or present personal lease option plans and personal lease data input, but would rather present business lease information and request business lease input. The checkout thus advantageously presents only that information and requested input which is relevant to the particular store which the customer is in. The checkout does not ask questions which are not relevant to a particular customer.

If the online store determines that a customer is a home consumer purchasing a computer system for home/personal use, then checkout advantageously avoids presenting information which is unrelated to a home consumer purchasing a computer system for home/personal use. For example, the checkout would not ask for a company name or an organization name. In addition, the checkout would further not ask about payment options such as a business lease. All payments options not directly related to the particular store which the customer is in would not be presented to the given customer. The checkout feature according to the present disclosure screens out unrelated checkout options, that is, those options unrelated to a particular customer or customer set.

With respect to checkout, each time checkout was needed to be customized in the creation of a new store for a prior online store, a new object or checkout page would be required to be created. That made it less scalable to ramp from one customer set to 10 customer sets, for example. In addition, that also meant going back to the software developers and reinventing an element of the store each time there was a need to expand the customer set. Such a prior method was inefficient.

The checkout is now database driven. Scaling is built in. That is, if another customer set is needed to be added to the online store, common elements are defined which define how the new customer set is to be different from a previous defined customer checkout, allowing that application to build a customer set checkout on the fly, a so that developer would not be involved. A tool set is provided for generating a customizable checkout to meet many customer's needs.

Further with respect to checkout, checkout of the present online store includes customizable features in contrast to a one-size-fits-all checkout of a prior online store. For example, for checkout, an at-home buyer will not have to discern or be subjected to any business lease information or input. Such business lease information or input acts as a disincentive upon the at-home purchaser and detracts from the at-home buying experience of the at-home online buyer. The at-home online buyer does not typically want to read through terms and conditions of a business lease. Those things that would be considered a disincentive for a given customer set are now advantageously removed from the online store of the particular customer set.

Delivery options and payment options are also customizable. One of the underlying principles is recognition of business verses personal store. A store can be identified as business (i.e., for business customers exclusively) or personal (i.e., for personal users only). In this manner there has been built in the ability to customize the checkout, so that the checkout can recognize, everywhere possible, the way to get those unrelated user aspects of the checkout away from the selected customer sets. For example, a business customer would not be met with the personal lease payments options and then have to avoid it, or click on it indirectly. Likewise, and more importantly, for personal users, the checkout avoids asking the personal user for a company name. In other words, the online store checkout does not ask the personal user for a company name, thus avoiding confusing the customer who might otherwise think that he or she does not have the right checkout form to complete. If the customer is confused, then the customer may decide to exit the online store and pick up the telephone to place an order rather than online. As a result, efficiencies would be lost when the sale is not placed online. The present online store advantageously maintains those efficiencies which are gained by placing customer orders online.

In places where there existed a possibility for confusion between personal versus business, the online store advantageously includes a customization to minimize any such confusion. That is, the online store avoids things which could confuse customers, especially personal customers. For instance, payment options, delivery options, and messages to customers for instructions in completing online forms, for example, are built in to be customizable, according to the given customer set.

Another element of the online store includes, for a business customer, the inquiry of what type of business is the customer in, so that the customer may be appropriately routed to a proper handling sales force, subsequent to an online purchase, in the event that further assistance is required. A personal customer does not need to be met with a page asking what type of business the customer is in. Such a message, in the later instance, would tend to be confusing and alienating to the personal customer. In a personal online store, those business type questions are not asked according to the customization built into checkout in conjunction with the method and apparatus of the present disclosure.

That which is defined per checkout in the database is part of the customizable elements of a checkout. The elements include what departments of the online store vendor can be offered for a checkout. For example, a business online store may recognize three types of businesses, small, medium, and large. Employee size designations can be used for how the online store wants a business customer to define itself. Under 2,000 employees can be considered a small business. The online store includes an ability to create a business store where those three business types/sizes are each defined as an allowable option for a given store.

In accordance with the online store of the present disclosure, upon a recognition of who a particular customer is (e.g., or in what customer set), the online store takes out the unrelated options and departments, and does not present them to the customer as options for the customer. The checkout for a given customer is defined as having only those valid options for who the online store knows the customer to be. For example, with respect to a federal government customer, if the federal government customer is identified as federal government, then there would be no relevant department choice. That choice is advantageously taken out of checkout for the federal government customer. The one department was recognized in the checkout logic as being: "if there is only one department, then do not present." That is, if a given checkout is defined as having only one valid department, then when the customer gets to checkout, the code for the online store and commerce application is written such that the one department would not present a choice of departments. Only when there are multiple departments and selections would the same be presented at the checkout. That is one aspect of customized checkout which is built into the present online store according to the present disclosure.

Information which is not relevant to a given customer (that is, the information does not make sense for that given customer) is not presented to that customer based upon the online store's understanding of who the customer is. In other words, based upon the online store's understanding of who the customer is, this would not make sense to you, it would only add confusion, or time and inconvenience. The online store thus has a built-in ability to make the checkout as customizable as possible, for each of the customer sets.

Additional messaging recommendations may be added to the checkout page to assist a user in the checkout process. For example, the messaging may include instructions for completing a particular section of the checkout page. Similarly, other messaging may be included, e.g., with respect to shipping/delivery. The messaging is database driven based upon the customer set of the user. Such messaging can be kept to a minimum to facilitate an ease of use by the user.

In operation, the online store includes an ability to recognize which customer set that a customer who accesses the online store is in, i.e., upon accessing the welcome page of the online store. Upon a recognition of the customer belonging to a particular customer set, the customer gets a store specific to the given customer. Customer set refers to a particular company, organization, or individual, thus there can be many customer sets. Part of the store difference is that the configurator determines what part of the online store does the customer get to see. The welcome page defines what products does the store allow the customer to see. The configurator determines which options the customer is allowed to look at within a given system (as chosen per the welcome page), merchandising options, what are allowed options, etc.

A customer is identified as being in a particular customer set according to what link the customer executed to get to the online store. That is, the link includes an embedded identifier which informs the online store which customer set that the customer is in. For example, a federal government customer would have clicked through the website at http://www.dell.com and eventually come to the federal site. The federal site contains federal specific information. Somewhere on the federal site page, the federal business segment of the online store vendor has said that when a customer goes to the store, the online store offers the customer an option to go to the federal site. A link is embedded for proceeding to the federal site, wherein the online store then acts to treat this customer as a federal customer because the customer came and read the federal site page content, and thus they have identified themselves as a federal customer.

Premier pages is an example of a particular type of customer set in which discount pricing is private and the information is password protected. The page that has the link to the store is password protected. The general model is that if you can get to a page that has a link to the store in it, then a customer is recognized as being in a particular customer group based upon the link used to access the online store. Customer sets may include individual customers, businesses, organizations, federal government, etc. Each customer set will see a version of the online store specific to the respective customer set. The underlying elements of the online store however remain the same. Upon identification of the customer set of a given customer, the online store operates based upon the prescribed customer set of the given customer. The presentation of the online store to each customer set will thus be different for each set. For the long lead time warning in the configurator, an option can be set in the online store to activate long lead time warnings for a given customer set. For example, home consumers are more sensitive to the fact that the home consumer may not wish to wait more than a normal lead times. A typical advertised lead time for the online store is on the order of one to two weeks. Such a home consumer would advantageously benefit from a long lead time warning. For example, the home consumer can modify the order as appropriate if the lead time of the customer configured computer system is not acceptable for the customer's particular requirements.

If any item has a lead time over three weeks, then lead time flags would be set within the online store to three weeks or higher. Thus any options with lead times of three weeks or higher would show up as "flags" (e.g., to display long lead time warning). Whereas, in a business customer set online store, the business customer may wait three weeks, but not six weeks, for the receipt of an order. Thus, an option having a long lead time of six weeks would show up as "flag". In other words, the flag is set to six weeks for the business customer set online store. It is important to understand that difference. The underlying feature here is that a flag is being set to indicate that the selection of a particular option will result in a lead time greater than a normal lead time, according to a particular customer set.

One difference between a compatibility warning (green check mark) and a long lead time warning (yellow exclamation mark) is that the option compatibility warning preferably provides an option compatibility warning message that is not generic. In other words, the option compatibility warning is preferably specific to the option or options which the user has selected. The long lead time warning indicates that there is an option on a long lead time. The long lead time warning preferably includes an icon and a message at a general level (e.g., "there are four warnings below") at a prominent location of the web page. A user would then scroll down the web page to find out which of the selections have long lead time warnings. For each option with a long lead time icon, the icon may be accompanied with a warning message that is specific to that option.

Compatibility warning carries a message with the warning and may include, for example, "there is a potential problem with your option selection." The choice of operating system is incompatible with the hard drive, etc. The compatibility icon is accompanied with a compatibility message which is specific to the particular option.

Everything in the configurator is specific to a given computer system (i.e., chassis) per customer or per set of customers. The welcome page is geared towards identifying a chassis. Given the chassis, the configurator displays the universe or possible options within that chassis, for a given customer set. Messaging has now been included in that option universe to assist a user in choosing a best selection for that user. If a user decides upon a different chassis, the user must return to the welcome page and select another chassis. The options within the configurator are dependent upon the chassis. If a user wants to go to a different universe, then the user must exit the configurator, go back to the welcome page, and select a new universe (i.e., a different chassis). Recommendations can include lead time warnings, as well as compatibility warnings.

Merchandising is another feature of the online store. Merchandising is provided to better emulate what a sales representative would do if a customer telephones the online store vendor to inquire about a computer system, wherein the online store merchandising provides a potential to sell a customer a richer computer system. The merchandising of the online store better emulates selling and cross-selling merchandising than a sales representative could perform. For example, merchandising may include up selling an extended service warranty, up selling more RAM, or a bigger hard drive or greater memory capacity. That is where merchandising messaging was built into the online store. The presence of the merchandising messaging at the point of sale is an improvement. The point of sale for the online store preferably includes the configurator and the cart.

The online store of the present disclosure advantageously includes a feature set which has been added to the configurator and to the cart. The present online store has also been advantageously upgraded from a reliability, performance, and maintenance standpoint. In addition, the present online store includes improvements which make it as robust as possible. Lastly, merchandising as discussed has been made to be customizable. The checkout also includes customizable features in contrast to a one-size-fits-all checkout of a prior online store. The online store of the present disclosure has been expanded to be a custom store customizable for every customer set.

The configurator now includes four new features, or added elements to the presentation of the standard store. The cart includes a new feature. The checkout has new custom features. Every version of the online store includes an ability to change such things as necessary for a given customer set (e.g., long lead time flags). The added elements of the present disclosure are thus all customizable by the store per given customer set.

End-to-end, the online store experience is advantageously improved. The online store has been presented from a database standpoint, its customization, and the making of the online store customizable, at least as much as to the extent of the features described herein. The online store is driven by the database in accordance with who the customer has been identified to be, as per the online store.

The online store and user interface of the present disclosure advantageously overcome deficiencies in the prior online store. That is, the prior online store was not as customizable as described herein with respect to the present online store. The focus of the prior online store was: "Do I have the right products at the right pricing?" Once the system has been selected in the prior online store, the checkout was the same for all customers. There was no customization on the back end of the prior online store. Furthermore, there was also some compromise on what the configurator did in the prior online store.

The online store and user interface of the present disclosure have expanded customization aspects of the store application, from the configurator to the checkout. The present online store and user interface have further improved upon what the configurator can deliver as a service, i.e., what the configurator can deliver as a feature set. Overall, the method and apparatus of the present disclosure provides an improved online store. Furthermore, an online store for use in the procurement of a customer configured computer system having a user interface has been described herein.

The online store includes a single online store which generates a given view for a particular customer set, which can be further customizable per customer. The online store, however, has the appearance of many different stores to many different customers. In essence, it's the same core online store, however, it is customizable for each customer, further being database driven. Customization of the online store has thus been advantageously improved, in conjunction with the added features as discussed herein.

The embodiments of the online store of the present disclosure advantageously improve upon on an accuracy, reliability, and overall quality of an online buying experience through an enhanced online commerce application specific to the ordering of custom-configured computer systems, including personal computer systems. The embodiments of the online store are optimized for responsiveness (availability and speed) to customer requests and for completeness in servicing of customer demand for personal computer related information. Completeness, in the later instance, is measured relative to an information delivery experienced when ordering via the telephone.

While the embodiments have been particularly shown and described with reference to the various embodiments thereof, it will be understood by those skilled in the art that various changes in form and detail may be made therein without departing form the spirit and scope of the embodiments, as set forth in the following claims.

What is claimed is:

1. A web-based online store having a user interface for enabling a custom configuration of a computer system according to an identification of a user belonging to a prescribed customer set, said online store comprising:

a configuration for configuring a computer system with options selected according to a prescribed user input, the options and a respective pricing for each option being presented on a configuration web page in accordance with the identification of the user belonging to a prescribed customer set;

a cart for temporarily storing the customer configured computer system, said cart including a cart web page;

a checkout for presenting payment options and for obtaining payment and delivery information, said checkout including a checkout web page;

a database for dynamically supplying configuration options to said configuration in accordance with the identification of the user belonging to the prescribed customer set; and a warning indicator for indicating an option which is subject to adversely impact a shipment of the configured computer system, the warning indicator including a lead time warning in connection with an option which is subject to incurring a lengthened lead time for shipment of the configured computer system, which is greater than a prescribed lead time, the prescribed lead time being in accordance with the identification of the user belonging to a prescribed customer set.

2. The online store of claim 1, wherein said configurator further includes merchandising recommendations for available options and their respective option details, the merchandizing recommendations being presented on the configurator web page, and wherein said database is further for dynamically supplying the merchandising recommendations to said configurator in accordance with the identification of the user belonging to the prescribed customer set.

3. The online store of claim 1, wherein said cart further includes merchandising recommendations for add-on options, the merchandising recommendations being presented on the cart web page, and wherein said database is further for dynamically supplying the merchandising recommendations to said cart in accordance with the identification of the user belonging to the prescribed customer set.

4. The online store of claim 1, wherein the payment options of said checkout are presented on the checkout web page, and wherein said database is further for dynamically supplying the payment options to said checkout in accordance with the identification of the user belonging to the prescribed customer set.

5. The online store of claim 1, further wherein the lead time warning includes a graphic and a text message for indicating the lengthened lead time for shipment.

6. The online store of claim 5, wherein the graphic includes an exclamation mark.

7. The online store of claim 1, wherein the option which is subject to incurring a lengthened lead time for shipment is one identified as having a significant impact on the time to delivery of the configured computer system.

8. The online store of claim 1, wherein the lead time warning is made present in the configurator upon an update/refresh of the configurator web page.

9. The online store of claim 1, wherein the warning indicator provides a general alert to the presence of any number of potentially problematic options displayed on the configurator web page and a long lead time icon displayed adjacent to each long lead time option's position in the configurator web page.

10. The online store of claim 1, wherein options are manually identified as worthy of a long lead time warning via entry of a flag in an item master record in said database.

11. The online store of claim 9, further wherein activation of a prescribed long lead time icon by the user results in the displaying of a manually-maintained listing of all items marked as significantly extending system delivery, in addition to a corresponding estimated time to delivery.

12. The online store of claim 1, wherein the warning indicator includes a system option compatibility warning indicator for providing a system compatibility warning upon the detection of a second option selected as per the prescribed user input which is incompatible in connection with a first option of the configured computer system.

13. The online store of claim 12, wherein the system option compatibility warning indicator includes a graphic and a text message for indicating the incompatibility of the second option with the first option.

14. The online store of claim 13, wherein the graphic includes a check mark.

15. The online store of claim 12, wherein the system option compatibility warning is made present in the configurator upon an update/refresh of the configurator web page.

16. The online store of claim 12, wherein the system option compatibility warning indicator provides a general alert to the presence of any number of potentially problematic system compatibility options displayed on the web page and a system incompatibility icon displayed adjacent to each potentially incompatible option's position in the configurator web page.

17. The online store of claim 1, wherein said configurator further includes an alternate view selector for selecting between a first presentation view and a second presentation view of the configurator web page, the first presentation view including drop down boxes for option selection and the second presentation view including radio buttons for use in option selection.

18. The online store of claim 3, wherein said checkout is customized according to the identification of the user belonging to the prescribed customer set, the customization including at least one of the following options selected from the group consisting of contact information, ownership information, type of business/organization, payment/billing options, and shipment/delivery options.

19. The online store of claim 3, wherein said checkout further screens the cart to determine if selections in the cart are from more than one specialty store, wherein a specialty store corresponds to a customized store of said online store for a prescribed customer set, further wherein a single user may have accessed said online store via more than one prescribed customer set.

20. A web-based online store having a user interface for enabling a custom configuration of a computer system according to an identification of a user belonging to a prescribed customer set, said online store comprising:

a configuration for configuring a computer system with options selected according to a prescribed user input, the options and a respective pricing for each option being presented on a configuration web page in accordance with the identification of the user belonging to a prescribed customer set, wherein said configuration further includes a warning indicator for indicating an option which is subject to adversely impact a shipment of the configured computer system;

a cart for temporarily storing the customer configured computer system, said cart including a cart web page;

a checkout for presenting payment options and for obtaining payment and delivery information, wherein the payment options presented are in accordance with the identification of the user belonging to the prescribed customer set, said checkout including a checkout web page;

a database for dynamically supplying configuration options to said configuration, merchandising information to said cart, and payment and delivery options to said checkout, wherein the respective web pages are dynamically generated in accordance with the identification of the user belonging to the prescribed customer set; and the warning indicator including a lead time warning in connection with an option which is subject to incurring a lengthened lead time for shipment of the configured computer system, which is greater than a prescribed lead time, wherein the prescribed lead time is in accordance with the identification of the user belonging to a prescribed customer set.

21. The online store of claim 20, wherein the warning indicator further includes a system option compatibility warning indicator for providing a system compatibility warning upon the detection of a second option selected as per the prescribed user input which is incompatible in connection with a first option of the configured computer system.

22. The online store of claim 21, wherein said checkout is customized according to the identification of the user belonging to the prescribed customer set, the customization including at least one of the following options selected from the group consisting of contact information, ownership information, type of business/organization, payment/billing options, and shipment/delivery options.

23. A method for enabling a custom configuration of a computer system according to an identification of a user belonging to a prescribed customer set via a user interface of a web-based online store, said method comprising the steps of:

providing a configuration for configuring a computer system with options selected according to a prescribed user input, the options and a respective pricing for each option being presented on a configuration web page in accordance with the identification of the user belonging to a prescribed customer set;

providing a cart for temporarily storing the customer configured computer system, the cart including a cart web page;

providing a checkout for presenting payment options and for obtaining payment and delivery information, the checkout including a checkout web page;

providing a database for dynamically supplying configuration options to the configuration in accordance with the identification of the user belonging to the prescribed customer set; and a warning indicator for indicating an option which is subject to adversely impact a shipment of the configured computer system, the warning indicator including a lead time warning in connection with an option which is subject to incurring a lengthened lead time for shipment of the configured computer system, which is greater than a prescribed lead time, the prescribed lead time being in accordance with the identification of the user belonging to a prescribed customer set.

24. The method of claim 23, wherein the configurator further includes merchandising recommendations for available options and their respective option details, the merchandising recommendations being presented on the configurator web page, and wherein the database is further for dynamically supplying the merchandising recommendations to the configurator in accordance with the identification of the user belonging to the prescribed customer set.

25. The method of claim 23, wherein the cart further includes merchandising recommendations for add-on options, the merchandising recommendations being presented on the cart web page, and wherein the database is further for dynamically supplying the merchandising recommendations to the cart in accordance with the identification of the user belonging to the prescribed customer set.

26. The method of claim 23, wherein the payment options of the checkout are presented on the checkout web page, and wherein the database is further for dynamically supplying the payment options to the checkout in accordance with the identification of the user belonging to the prescribed customer set.

27. The method of claim 23, further wherein the lead time warning includes a graphic and a text message for indicating the lengthened lead time for shipment.

28. The method of claim 27, wherein the graphic includes an exclamation mark.

29. The method of claim 23, wherein the option which is subject to incurring a lengthened lead time for shipment is one identified as having a significant impact on the time to delivery of the configured computer system.

30. The method of claim 23, wherein the lead time warning is made present in the configurator upon an update/refresh of the configurator web page.

31. The method of claim 23, wherein the warning indicator provides a general alert to the presence of any number of potentially problematic options displayed on the configurator web page and a long lead time icon displayed adjacent to each long lead time option's position in the configurator web page.

32. The method of claim 23, wherein options are manually identified as worthy of a long lead time warning via entry of a flag in an item master record in the database.

33. The method of claim 23, further wherein activation of a prescribed long lead time icon by the user results in the displaying of a manually-maintained listing of all items marked as significantly extending system delivery, in addition to a corresponding estimated time to delivery.

34. The method of claim 23, wherein the warning indicator includes a system option compatibility warning indicator for providing a system compatibility warning upon the detection of a second option selected as per the prescribed user input which is incompatible in connection with a first option of the configured computer system.

35. The method of claim 34, wherein the system option compatibility warning indicator includes a graphic and a text message for indicating the incompatibility of the second option with the first option.

36. The method of claim 35, wherein the graphic includes a check mark.

37. The method of claim 34, wherein the system option compatibility warning is made present in the configurator upon an update/refresh of the configurator web page.

38. The method of claim 34, wherein the system option compatibility warning indicator provides a general alert to the presence of any number of potentially problematic system compatibility options displayed on the web page and a system incompatibility icon displayed adjacent to each potentially incompatible option's position in the configurator web page.

39. The method of claim 23, wherein the configurator further includes an alternate view selector for selecting between a first presentation view and a second presentation view of the configurator web page, the first presentation view including drop down boxes for option selection and the second presentation view including radio buttons for use in option selection.

40. The method of claim 25, wherein the checkout is customized according to the identification of the user belonging to the prescribed customer set, the customization including at least one of the following options selected from the group consisting of contact information, ownership information, type of business/organization, payment/billing options, and shipment/delivery options.

41. The method of claim 25, wherein the checkout further screens the cart to determine if selections in the cart are from more than one specialty store, wherein a specialty store corresponds to a customized store of the online store for a prescribed customer set, further wherein a single user may have accessed the online store via more than one prescribed customer set.

42. A method for enabling a custom configuration of a computer system according to an identification of a user belonging to a prescribed customer set via a user interface of a web-based online store, said method comprising the steps of:

providing a configuration for configuring a computer system with options selected according to a prescribed user input, the options and a respective pricing for each option being presented on a configuration web page in accordance with the identification of the user belonging to a prescribed customer set, wherein the configuration further includes a warning indicator for indicating an option which is subject to adversely impact a shipment of the configured computer system;

providing a cart for temporarily storing the customer configured computer system, the cart including a cart web page;

providing a checkout for presenting payment options and for obtaining payment and delivery information, wherein the payment options presented are in accordance with the identification of the user belonging to the prescribed customer set, the checkout including a checkout web page;

providing a database for dynamically supplying configuration options to the configuration, merchandising information to the cart, and payment and delivery options to the checkout, wherein the respective web pages are dynamically generated in accordance with the identification of the user belonging to the prescribed customer set; and the warning indicator including a lead time warning in connection with an option which is subject to incurring a lengthened lead time for shipment of the configured computer system which is greater than a prescribed lead time, wherein the prescribed lead time is in accordance with the identification of the user belonging to a prescribed customer set.

43. The method of claim 42, wherein the warning indicator further includes a system option compatibility warning indicator for providing a system compatibility warning upon the detection of a second option selected as per the prescribed user input which is incompatible in connection with a first option of the configured computer system.

44. The method of claim 43, wherein the checkout is customized according to the identification of the user belonging to the prescribed customer set, the customization including at least one of the following options selected from the group consisting of contact information, ownership information, type of business/organization, payment/billing options, and shipment/delivery options.

45. An on-line store commerce application user interface for enabling the custom configuration and pricing of a computer system via a web site on the Internet by an Internet user, the interface comprising:

configuration means for configuring a computer system with options selected according to a prescribed user input, said configuration means including a configuration web page;

means for pricing the personal computer configured by said configuration;

means for providing a warning upon the detection of an option which is subject to adversely impacting a shipment of the configured computer system, including at least one of the following warnings consisting of a lead time warning and an option compatibility warning; and the warning means including a lead time warning in connection with an option which is subject to incurring a lengthened lead time for shipment of the configured computer system, which is greater than a prescribed lead time, the prescribed lead time is in accordance with an identification of the user belonging to a prescribed customer set.

46. The user interface of claim 45, wherein the lead time warning includes a graphic and a text message for indicating the lengthened lead time for shipment.

47. The user interface of claim 46, wherein the graphic includes an exclamation mark.

48. The user interface of claim 45, wherein the option which is subject to incurring a lengthened lead time for shipment is one identified as having a significant impact on the time to delivery of the configured computer system.

49. The user interface of claim 45, wherein the lead time warning is made present in the configurator means upon an update/refresh of the configurator web page.

50. The user interface of claim 45, wherein said lead time warning means provides a general alert to the presence of any number of potentially problematic options displayed on the configurator web page and a long lead time icon displayed adjacent to each long lead time option's position on the configurator web page.

51. The user interface of claim 45, wherein options are manually identified as worthy of a long lead time warning via entry of a flag in an item master record in a product database of the on-line store.

52. The user interface of claim 50, further wherein activation of a prescribed long lead time icon by the user results in the displaying of a manually-maintained listing of all items marked as significantly extending system delivery, in addition to a corresponding estimated time to delivery.

53. The user interface of claim 45, wherein the warning means includes a system option compatibility warning indicator for providing a system compatibility warning upon the detection of a second option selected as per the prescribed user input which is incompatible in connection with a first option of the configured computer system.

54. The user interface of claim 53, wherein the system option compatibility warning indicator includes a graphic and a text message for indicating the incompatibility of the second option with the first option.

55. The user interface of claim 54, wherein the graphic includes a check mark.

56. The user interface of claim 53, wherein the system option compatibility warning is made present in the configurator means upon an update/refresh of the configurator web page.

57. The user interface of claim 53, wherein the system option compatibility warning indicator provides a general alert to the presence of any number of potentially problematic system compatibility options displayed on the web page and a system incompatibility icon displayed adjacent to each potentially incompatible option's position in the configurator web page.

* * * * *